US011514713B2

(12) United States Patent
Singh et al.

(10) Patent No.: US 11,514,713 B2
(45) Date of Patent: Nov. 29, 2022

(54) FACE QUALITY OF CAPTURED IMAGES

(71) Applicant: Apple Inc., Cupertino, CA (US)

(72) Inventors: Abhishek Singh, Cupertino, CA (US); Vinay Sharma, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 204 days.

(21) Appl. No.: 16/821,611

(22) Filed: Mar. 17, 2020

(65) Prior Publication Data

US 2020/0380243 A1 Dec. 3, 2020

Related U.S. Application Data

(60) Provisional application No. 62/855,464, filed on May 31, 2019.

(51) Int. Cl.
*G06F 16/583* (2019.01)
*G06K 9/62* (2022.01)
(Continued)

(52) U.S. Cl.
CPC .............. *G06V 40/164* (2022.01); *G06T 7/75* (2017.01); *G06V 40/167* (2022.01);
(Continued)

(58) Field of Classification Search
CPC ...... G06V 10/25; G06V 20/46; G06V 40/161; G06V 40/164; G06V 40/167; G06V 40/169; G06V 40/173
See application file for complete search history.

(56) References Cited

U.S. PATENT DOCUMENTS 10,318,721 B2 * 6/2019 Sharma ............... H04L 63/0861
2011/0074966 A1 * 3/2011 Cerosaletti ........... G06V 10/993
348/222.1
(Continued)

FOREIGN PATENT DOCUMENTS

CN 107480576 A 12/2017
CN 108537787 A * 9/2018 ......... G06K 9/00268
(Continued)

OTHER PUBLICATIONS

CN108537787A translation from PE2E-Search (Year: 2018).*
(Continued)

*Primary Examiner* — Soo Shin
(74) *Attorney, Agent, or Firm* — Blank Rome LLP

(57) ABSTRACT

The disclosure pertains to techniques for image processing. One such technique comprises a method for image selection, comprising: obtaining a sequence of images, detecting a first face in one or more images of the sequence of images, determining a first location for the detected first face in each of the images having the detected first face, generating a heat map based on the first location of the detected first face in each of the images of the sequences of images, determining a face quality score for the detected first face for each of the one or more images having the detected first face, determining a peak face quality score for the detected first face based in part on the face quality score and the generated heat map, and selecting a first image of the sequence of images, corresponding with the peak face quality score for the detected first face.

20 Claims, 6 Drawing Sheets

(51) Int. Cl.
*G06N 20/00* (2019.01)
*G06T 7/73* (2017.01)
*G06V 10/25* (2022.01)
*G06V 20/40* (2022.01)
*G06V 40/16* (2022.01)

(52) U.S. Cl.
CPC .. *G06V 40/169* (2022.01); *G06T 2207/20081* (2013.01); *G06T 2207/30201* (2013.01)

(56) References Cited

U.S. PATENT DOCUMENTS

| | | | |
|---|---|---|---|
| 2015/0363635 A1* | 12/2015 | Suri | G11B 27/28 386/241 |
| 2017/0344808 A1* | 11/2017 | El-Khamy | G06V 40/168 |
| 2018/0341835 A1* | 11/2018 | Siminoff | G06V 10/751 |
| 2019/0080149 A1 | 3/2019 | Gernoth et al. | |
| 2020/0005060 A1* | 1/2020 | Martin | G06V 40/197 |
| 2020/0085312 A1* | 3/2020 | Tzvieli | A61B 5/02055 |
| 2020/0175260 A1* | 6/2020 | Cheng | G06V 20/64 |
| 2020/0250402 A1* | 8/2020 | Kim | G06V 40/161 |
| 2020/0293759 A1* | 9/2020 | Debnath | G06K 9/6218 |
| 2021/0133432 A1* | 5/2021 | Wang | G06V 20/52 |
| 2021/0141896 A1* | 5/2021 | Streit | G06K 9/6256 |

FOREIGN PATENT DOCUMENTS

| | | | |
|---|---|---|---|
| CN | 109241910 A | | 1/2019 |
| CN | 110909634 A | * | 3/2020 |
| EP | 2958308 A1 | | 12/2015 |

OTHER PUBLICATIONS

CN110909634A translation from PE2E-Search (Year: 2020).*
International Search Report dated Sep. 10, 2020 in counterpart PCT Application No. PCT/US2020/035299.
Chang, Huiwen et al. "Automatic Triage for a Photo Series." ACM Trans. Graph., vol. 35, No. 4, Article 148, Jul. 11, 2016, pp. 1-10. ISSN: 0730-0301, DOI: 10.1145/2897824.2925908.
Do, Nhu-Tai et al. "Face Tracking with Convolutional Neural Network Heat-Map." Machine Learning and Soft Computing, Feb. 2, 2018, pp. 29-33. DOI: 10.1145/3184066.3184081.
Liszewski, Andrew, "Google Adds AI That Automatically Stops You From Filling Your Pixel 3 With Selfie Trash," Apr. 17, 2019, Retrieved from the Internet: URL: https://gizmodo.com/google-adds-ai-that-automatically-stops-you-from-fillin-1834113245 [Retrieved on May 7, 2019].
Shiee, Navid, and Aseem Agarwala, "Take Your Best Selfie Automatically, with Photobooth on Pixel 3," Apr. 16, 2019, Retrieved from the Internet: URL: https://ai.googleblog.com/2019/04/take-your-best-selfie-automatically.html [Retrieved on May 7, 2019].

* cited by examiner

FACE QUALITY OF CAPTURED IMAGES

RELATED APPLICATIONS

This application claims priority to U.S. Provisional Application No. 62/855,464, filed May 31, 2019, which is hereby incorporated by reference.

BACKGROUND

The subject matter disclosed herein relates to the field of digital imaging and, without limitation, techniques for improving facial quality of captured images.

Digital imaging systems, such as video or still imaging cameras are capable of capturing a very large number of images in a relatively short period of time. Increasingly, cameras are capable of capturing tens or even hundreds of images a second. Image capturing may also occur prior to or after other user interactions. For example, images may be captured when a camera is active, but the capture button has not yet been pressed (or has just been released), in order to compensate for a user pressing the capture button too late (or too soon).

In many cases, users may only want to keep a single image or a relatively small subset of these images. Existing techniques for selecting images from an image sequence, such as a video clip or burst of images, include using face detection, expression detection, and/or motion detection. However, such techniques may not be best suited for capturing a full range of images having high quality representations of human faces. As an example, previous implementations have attempted, using facial and expression detection, to locate faces and then detect smiles or other similar expressions on those faces in order to either capture or select images. However, a smiling face does not adequately define the range of facial images a user may want to capture. The user may be less interested in an image of the person smiling, than, for example, a person looking a certain way, having a certain expression, or a face that is posed (or composed) in a visually-pleasing way, etc. Techniques for detecting and capturing images based on overall facial quality or "picture-worthiness" are thus desired.

SUMMARY

This disclosure relates generally to the field of image processing. More particularly, but not by way of limitation, aspects of the present disclosure relate to a computer-implemented method for image processing. In some embodiments, the method comprises: obtaining a sequence of images, detecting a first face in one or more images of the sequence of images, determining a first location for the detected first face in each of the one or more images, of the sequence of images having the detected first face, generating a heat map based on the first location of the detected first face in each of the images of the sequences of images, determining a face quality score for the detected first face for each of the one or more images, of the sequence of images having the detected first face, determining a peak face quality score for the detected first face based at least in part on the face quality score and the generated heat map, and selecting a first image of the sequence of images, corresponding with the peak face quality score for the detected first face.

Aspects of the present disclosure relate to selecting images based on a relative location and quality (e.g., in terms of "picture-worthiness") of faces within the images of the sequence of images. The relative location of faces may be determined based on temporal heat maps, which accumulate heat map values for one or more faces over a sequence of images. This accumulation in the form of the heat map may be used to help deemphasize transient faces, i.e., faces that are not present in the sequence of images for a relatively long period of time, which may be less likely to be desired subjects of the images, thereby allowing for selection of images more likely to be desired by the user, i.e., photos including faces that are present in a larger portion of the sequence of images.

As mentioned above, faces detected in images of the image sequences may be evaluated for "picture-worthiness" using artificial intelligence (AI) techniques, such as machine learning or deep learning, to generate a face quality score. The heat map values may be used to further weight or scale the face quality score, e.g., based on the temporal prevalence of a given face over the sequence of images. Facial recognition may also be used to further weight or scale the face quality score, e.g., based on how closely-related the recognized face and the owner of the image are.

Images from the image sequence may then be selected based on the resulting face quality scores (i.e., inclusive of any desired weighting schemes). The image selection methods disclosed herein may also be used to implement a "shutterless" mode for the imaging device, e.g., allowing the imaging device to determine the best moments in which to automatically capture an image (i.e., without user intervention), e.g., over an open-ended or predetermined time interval. Image selection may be applied to single-person images or multi-person images. In certain cases, an intent classifier may be used to rate images based on the degree to which they likely reflect a "picture worthy" version of a single-person image and/or a multi-person group image.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device. In other embodiments, such instructions may be implemented by an electronic device, e.g., an image capture device, comprising a memory, one or more image capture devices, and one or more processors operatively coupled to the memory, wherein the one or more processors are configured to execute the instructions.

DETAILED DESCRIPTION

Figure 1:
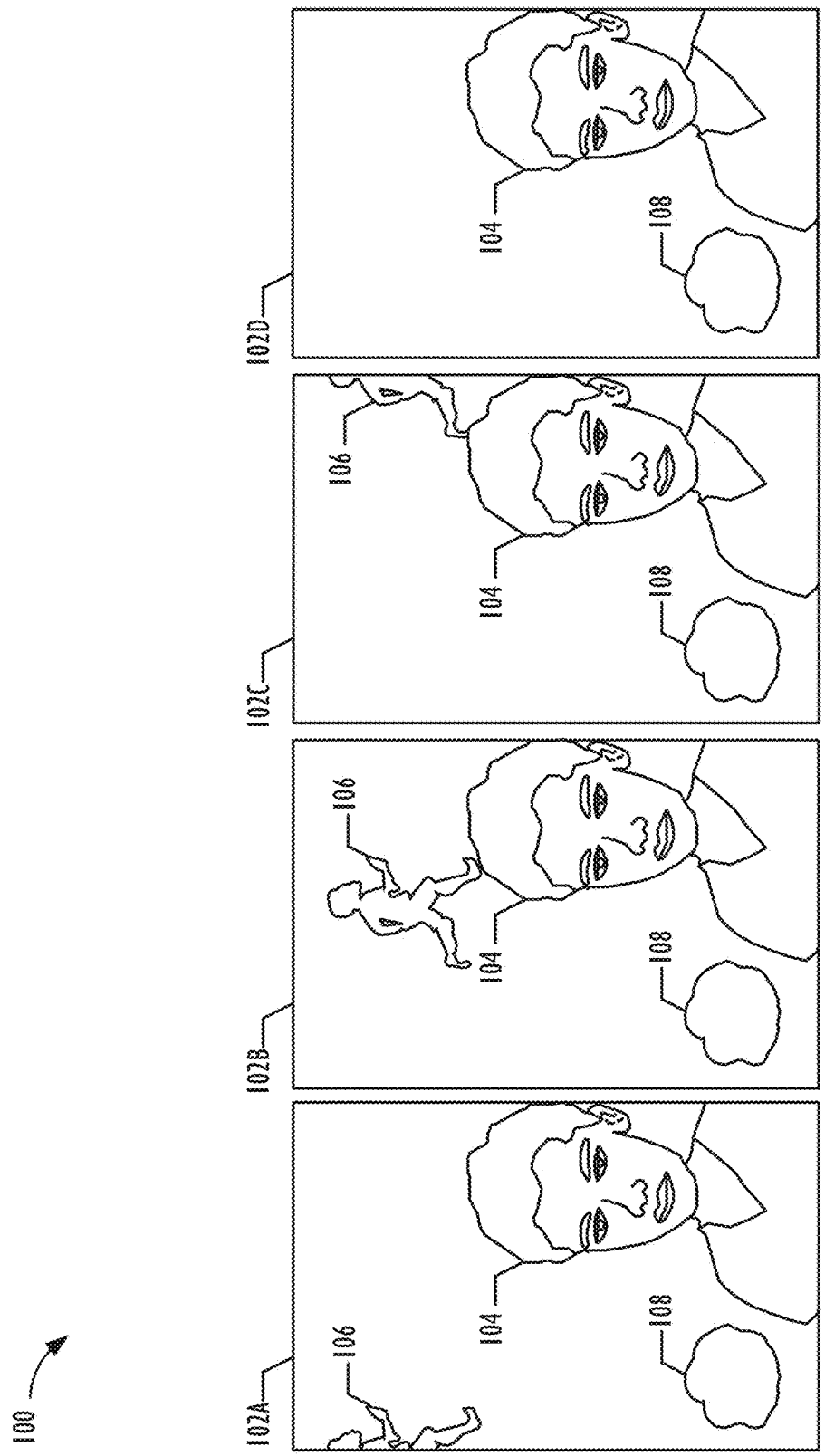
FIG. 1 illustrates an example portrait image sequence, in accordance with aspects of the present disclosure.

This disclosure pertains to systems, methods, and computer readable media to improve the operation of digital imaging systems. More specifically, aspects of the present disclosure relate to improving selection of images from among sequences of images, based on a relative location and quality of faces within the images of the sequence of images.

Generally, selecting images from an image sequence can be used both for post-capture processing and in processing images as they are being observed by an imaging device. This processing, for example, may help identify a best or most visually appealing image, or set of images, of the image sequence. In the post-capture case, image sequences may be captured by the imaging device, the resulting images processed, and images selected from the image sequence. These selected images may be presented to the user, used for indexing, to create summaries, thumbnails, slideshows, select favorite images from, etc., for the image sequence. In the case of processing images as they are being observed, image sequences may be processed to select images to be stored (e.g., images that would likely be of interest to a user) without requiring user interaction, such as by pressing a shutter or capture button. In certain cases, selecting images to be stored may select when to start storing a set of images or a video sequence. For example, an image sequence may be processed as they are observed by the imaging device and an image set stored based on the selected images. These image sets may be based on the selected image and the image set may start at a point in time before the selected image, at the selected image, or after the selected image.

For a particular image sequence, scene classifiers may further be used to determine that the image sequence is a portrait image sequence rather than, for example, an action image sequence capturing an action scene, a landscape image sequence, or some other related image sequence. For a portrait image, rather than looking at particular predefined attributes for an image, such as a contrast, color, exposure, composition, presence of a smile, etc., a portrait image may be captured based on an overall face quality score as determined by an artificial intelligence system, such as a machine learning model or deep learning model trained to identify high quality or visually-pleasing images including human faces, that takes into account context in which the detected faces appear. For example, a user taking a selfie with a particular background may position themselves within a frame and steady the camera. Another person may then walk through the frames. Given such a sequence of images, the user may be interested primarily with people that appear consistently within the sequence of images. Prioritizing face quality for people that appear consistently within the sequence of images and, in some instances, people that may specifically be known to the user, e.g., as determined via techniques such as facial recognition, may be useful to help select images that a user would perceive as more relevant and higher quality from among the sequence of images.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the claimed subject matter, leaving resorting to the claims as a potential necessity to determine such claimed subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of graphical processor interface software or graphical processing systems.

A portrait image sequence contains one or more faces within images of the image sequence. Referring now to FIG. 1, which illustrates an example portrait image sequence 100, in accordance with aspects of the present disclosure. This example portrait image sequence 100 includes four images 102A-102D (collectively 102). While this portrait image sequence 100 includes four images, it may be understood that other portrait image sequences may include at least two images. In this example, portrait image sequence 100 includes an intended subject 104 that remains largely static relative to frames of the images of the portrait image sequence 100. The portrait image sequence 100 also includes a second person 106 entering the frame in image 102A, moving across the frame in image 102B, and exiting the frame in image 102C. The portrait image sequence 100 also includes a non-human object, such as bush 108. In certain cases, the portrait image sequence may comprise a sequence of real-time or near real-time images from the camera and images selected from the image sequence may be stored and the selected image used to represent the image sequence as a thumbnail or image displayed to the user. Images which are not selected may be discarded, or also may be stored. For example, all the images in the image sequence may be stored, or the selected images stored. In certain cases, a number of images, or a number of seconds worth of images, either before, after, or both before and after the selected image may be stored. In certain cases, the image sequence may begin after a certain event is detected by an imaging device. For example, a shutter release may be triggered on the imaging device or the imaging device may be switched to a certain mode. In certain cases, an input from another sensor or processing of the imaging device may be used to begin the image sequence. For example, the image sequence may begin based on input from a gyroscope or accelerometer indicating that the imaging device has been steadied, held in a certain pose, etc. In accordance with aspects of the present disclosure, facial detection and/or recognition may be used to track and/or recognize faces present in the captured scene.

Generally, at least one of the faces in the image sequence is a target subject of the portrait image sequence. Facial detection and tracking may be performed on the images of the image sequence to locate and track faces in the images. Faces may be detected and tracked in the images via any known technique, such as model-based matching, low-level feature classifiers, deep learning, etc. Generally, faces may be detected and location information from the detected faces can be used to generate a heat map with respect to locations of the detected faces across the image sequence. In certain cases, detected faces may be tracked such that a face for a particular person is tracked from one frame to the next across the image sequence. In certain cases, faces may be identified or recognized, for example, by matching detected faces against faces of people known by the user and tracked across the frames of the image sequence.

Figure 2:
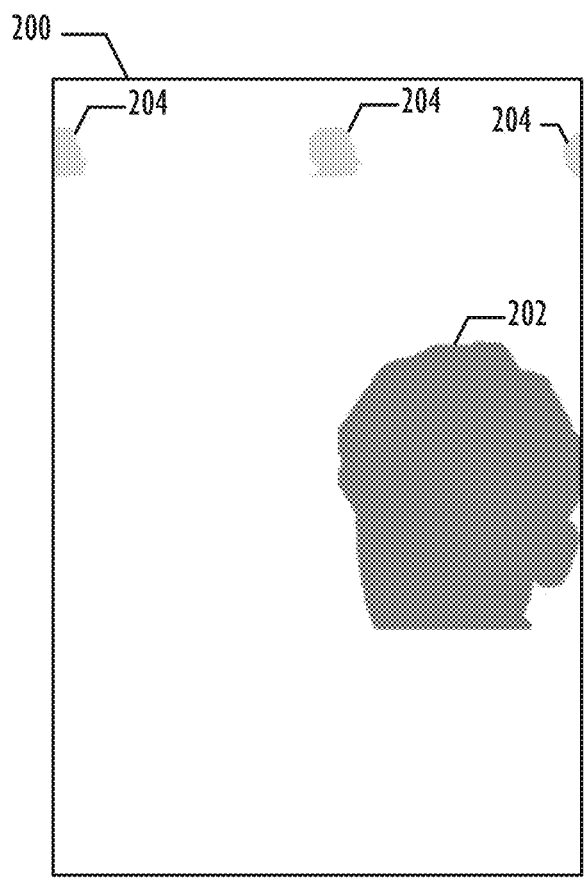
FIG. 2 illustrates an example visualization of a heat map for the image sequence, in accordance with aspects of the present disclosure.

FIG. 2 illustrates an example visualization of a heat map 200 for the image sequence, in accordance with aspects of the present disclosure. It may be understood that the heat map 200 of FIG. 2 is a visual representation of an in-memory object, such as a data object, and may not be displayed to or accessible by a user or program. Generally, the heat map plots the locations of the detected faces within the frames of the image sequence into a single map. In cases where the image sequence is representative of real-time images from the imaging device, the heat map plots may be accumulated as images of the image sequence arrive. In certain cases, objects in the images that are not detected as faces may be ignored. In heat map 200, areas of the heat map get darker the more often a particular detected face appears in an area of the frame of images in the image sequence. In this example, a first region 202 of the heat map 200 corresponding to the intended subject 104 of FIG. 1 appears darker than a second region 204 of the heat map 200 corresponding to the second person 106 of FIG. 1 as the intended subject 104 appeared in the same area of the frame across more images of the image sequence than the second person 106.

Generally, subjects of a portrait image sequences tend not exhibit large amounts of intended motion, relative to the frame, across images of the image sequence. That is, outside of initially stabilizing or framing a portrait type photo of an intended subject, the intended subject tends to hold still and generally does not move to a large extent around the image frame in the image sequence. Thus, detected faces may be evaluated based on their relative motion within the frame as indicated by the heat map. For example, the detected faces that remain relatively consistently positioned across the frames, corresponding to darker areas of the heat map 200, may be more likely to be relevant to the user and valued more heavily than detected faces that move around the frame across the image sequence. In certain cases, this heat map value may also be adjusted as a function of the size of the detected face, where larger detected faces may be generally valued more heavily. This size function may be based on an absolute size or relative size as compared to other detected faces. This heat map valuation helps distinguish intended subjects of the image sequence from, for example, a passerby or people in the background.

In accordance with aspects of the present disclosure, a heat map value may be used in conjunction with a face quality score of the detected faces. For example, the heat map value may be used to determine whether a face quality score is obtained for a particular detected face. As another example, the heat map value may be used as a weight applied to the face quality score for a respective detected face. These heat map values for a detected face may be an absolute value or assigned relative to another detected face. In such cases, a threshold or relative heat map value may be set, such that the detected face should appear in a relatively similar location in a minimum number of frames before a face quality score is obtained for that detected face. For a location of the detected face in an image, the heat map value associated with the location for the detected face is incremented as the detected face remains in that location. In certain cases, heat map values may be associated with detected and tracked faces and separate heat maps can be created for each tracked face.

This heat map value is aggregated across images of the sequence of images. If the detected face remains in a particular location sufficient for the heat map value to exceed the threshold heat map value, then face quality scores may be obtained for the detected face. In certain cases, this threshold may be relative to heat map values associated with other detected faces in the sequence of images. Heat map value thresholds may help enhance performance by filtering out faces that are less likely to be a subject of the image sequence (e.g., due to their appearing only briefly over the time duration of the image sequence), so that the face quality analysis can be focused on detected faces that are more likely to be relevant to a user. In other cases, other criteria could also be used, in conjunction with the heat map, to determine whether the face quality analysis is performed for a particular face, such as, for example, sizes of a face, a confidence score as determined by a face detector, a confidence score from a face recognizer as to whether a face is likely to be known by the user, etc.

In certain cases, the heat map values may also be evaluated as a part of determining relevancy of the face quality score. For example, the heat map values may be used as a weight applied to the face quality score for a respective detected face. As a more detailed example, the longer that a detected face remains in a particular location of the frame, the higher the heat map value(s) (and, thus, weight) associated with that detected face may be. Returning to the example discussed in conjunction with FIG. 2, the first region 202 of the heat map 200 appeared in the same area of the frame across every image and may be associated with a maximum (or near-maximum) heat map value, e.g., a weight of '1' on a normalized scale of 0 to 1. Another face that moves around the frame or is present for a shorter duration in time may then be associated with a lower weight. In the example discussed in FIG. 2, the second region 204, which moved every image relative to the frame may be associated with a lower a heat map value, such as 0.1 (on the aforementioned normalized scale of 0 to 1), as compared to the first region 202. Face quality scores may be weighted for each detected face, for example, by multiplying the face quality scores for each detected face in a given image from the image sequence by their respective heat map value. In certain cases, face quality scores may be adjusted based on heat map value for detected faces that are associated with at least a threshold heat map value. Detected faces associated with heat map values which do not meet the threshold heat map value may be ignored.

According to aspects of the present disclosure, detected faces in the image sequence may be assigned a face quality score for each frame in which they are detected. In certain cases, a machine learning model (MLM) classifier may be used to assign the face quality score. It may be understood that the MLM may encompass a deep learning and/or a neural network system. Rather than training the MLM classifier on specific picture qualities, such as color, exposure, framing, etc., the MLM classifier may be holistically trained based on overall "picture worthiness" of a face. For example, the MLM classifier may be trained on pairs of images of a person, annotated indicating which image of the pair should be kept, e.g., on the basis of which picture is overall more visually-pleasing to the annotator. Generally, evaluating faces as a whole focuses on whether the face is visually interesting or on aesthetics of the face as a whole, rather than attempting to evaluate a face on any specific aspect or group of aspects, such as lighting, framing, focus, presence of a smile, gaze direction, etc. and then combining these aspects into a score. Other training methodologies may also be used, however these training methodologies should measure the face quality as a whole, rather than measuring separate aspects of face quality, such as by using detectors for lighting, smile, crease, emotion, gaze, attention, etc. Generally, for a given input, such as a detected face of an image of the image sequence, MLM classifier a machine learning model outputs a prediction as a confidence score indicating how confident the machine learning model is that the input corresponds with a particular group the classifier is trained on. For example, given a MLM classifier trained to detect overall picture worthiness of a detected face, the MLM classifier may output a score that indicates how confident the MLM classifier is that the detected face is picture worthy. This score may be used as the face quality score of the corresponding detected face in a given image.

In certain cases, the MLM may be updated based on user selected images. In certain cases, these updates may be per-user or per-device. For example, a user may choose to keep images other than a selected image. These images may be used for additional training of the machine model, either by the imaging device, or by a separate electronic device, such as a server. In some cases, these images may be labeled and uploaded to a repository for use in training and creating updates to the machine learning model. In certain cases, updates may also be made for sets of users based on the additional training. These updates may then be applied to the machine learning model on the imaging device or on other imaging devices.

Figure 3A:
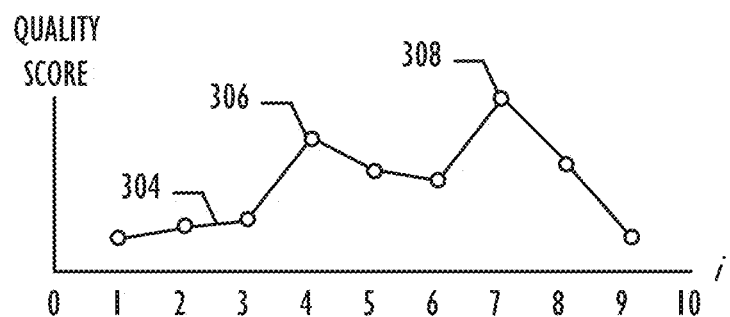
FIGS. 3A-3B are example graphs of face quality scores, in accordance with aspects of the present disclosure.
Figure 3B:
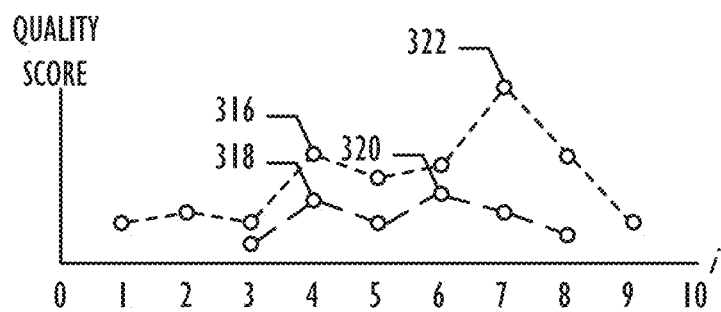

Once face quality scores for detected faces are generated for images of the image sequence, the face quality scores for each image may be plotted. FIGS. 3A-3B are example graphs of face quality scores 300, in accordance with aspects of the present disclosure. Face quality scores for detected faces may be sequenced for the image sequence to select images with the relatively highest corresponding face quality scores. For example, graph 302 of FIG. 3A plots a face quality score 304 for a detected face on the Y-axis and image i in the image sequence, ascending from 1-10 in numerical order across the x-axis. In certain cases, the face quality scores associated with a detected face may be adjusted based on the heat map value associated with the detected face. For example, the heat map value associated with a respective detected face may be used to adjust the face quality score for the respective detected face (e.g., via a weighting process) prior to image selection. This adjustment of the face quality score may be performed for each detected face in each image of the image sequence.

Images may be selected based on, for example, peaks in face quality scores within a sliding window. The sliding window generally starts with the first image and looks for peaks in the face quality score within N number of images. The sliding window then shifts to the next image, looking for peaks, and repeating until the process is stopped. The sliding window may look for peaks within a certain number of images and select the highest peak within the sliding window.

As a more detailed example, the sliding window for graph 302 may start by looking for a peak between images 1 and 2, and finding none, move to include image 3, then image 4, and so forth. A peak 306 may be detected after the sliding window moves to include image 5 and image 4 may be selected from graph 302. The sliding window then moves on to the next image and once the sliding window reaches moves to include image 6, image 1 is no longer included within the sliding window. As image 4 has already been selected, the image is not selected again. As the sliding window continues moving, image 7 may be selected from graph 302 after the sliding window moves to include image 8 and detects peak 308. The sliding window may be moved, for example, to consider images as they are received at the imaging device. In certain cases that do not utilize a sliding window, the selected image may be the highest score across an image sequence, in which case image 7 may be selected from graph 302. In other cases, peak detection may be applied after the complete image sequence is obtained. In certain cases, images corresponding to detected peaks may be selected. In certain cases, images with the lowest face quality score, for example identified based on detected valleys in the face quality scores, may also be selected, for example as candid images, or to contrast other selected images.

Generally, images containing faces of known people may be more important than images including unknown faces. In certain cases, a facial recognition system may also be used, either in place of or in conjunction with the face quality score. The facial recognition system may recognize faces known to a user and help prioritize images that include faces known to the user. The facial recognition system may be configured to recognize faces known to the user. For example, the facial recognition system may be a MLM classifier trained on labeled images which include faces of people known by the user. These images may be provided by, or associated with the user, such as through a metadata network associated with the user's digital asset (DA) library. The user's DA library may include media items such as photos, videos, image sequences, etc. in a collection associated with the user. In certain cases, facial recognition systems may be a separate MLM classifier, or alternatively, the facial quality MLM classifier may be configured to both generate a face quality score and a second score indicating whether a particular detected face is associated with the user or known by the user. This second score may be used to adjust the face quality score in a manner similar to the heat map value. In certain cases, the facial quality MLM classifier may be configured to perform this adjustment as a part of generating the face quality score.

Graph 310 of FIG. 3B plots face quality scores for a first tracked detected face 312 and a second tracked detected face 314 on the Y-axis and image i in the image sequence, ascending from 1-10 in numerical order across the x-axis. Where images include more than one tracked detected face, face quality scores for each tracked detected face may be determined and images may be selected based on, for example, detected peaks in face quality scores for the faces. For example, image selected may include face quality peaks for multiple tracked detected faces. In such cases, image 4 may be selected based on a peak 316 in the face quality score for the first tracked detected face 312 coinciding with peak 318 in the face quality score for the second tracked detected face 314. In certain cases, image 6 and 7 may also be selected based on peak 322 for the first tracked detected face 312 being near in time with peak 320 for the second tracked detected face 314. Additionally, images may be selected which include face quality peaks for at least one tracked detected face. For example, image 6 may be selected based on peak 320 in the face quality score for the second tracked detected face 314, and image 7 may also be selected based on peak 322 in the face quality score for the first tracked detected face 312. In certain cases, facial recognition may be performed for the multiple tracked detected faces and selected images may be associated with a recognized person based in part on the peaks in the face quality score for the recognized person. In certain cases, image selection may also be based on an aggregated face quality score. For example, the face quality scores for the first and second tracked detected faces may be summed together and peak detection performed for the aggregated face quality scores. In certain cases, this aggregation of face quality scores may be performed in addition to and after individually weighting the face quality scores for the tracked detected faces.

As discussed above in conjunction with a single detected face, image selection with multiple detected faces may be performed based on a sliding window. In accordance with certain aspects, larger groups of people, such as 3 or more people, may result in too many images being selected based on peaks in face quality scores. In certain cases, face quality scores may be augmented, for example, by one or more intent classifiers. These intent classifiers may MLM classifiers trained to detect group intents. For example, intent classifiers may be trained to detect gaze directions to help select images where groups of faces are gazing in the same direction. This direction may or may not be at the image capturing device, for example, where everyone is looking at a particular object. Similarly, intent classifiers may be trained to detect actions such as pointing, jumping, gasping, etc.

Figure 4:
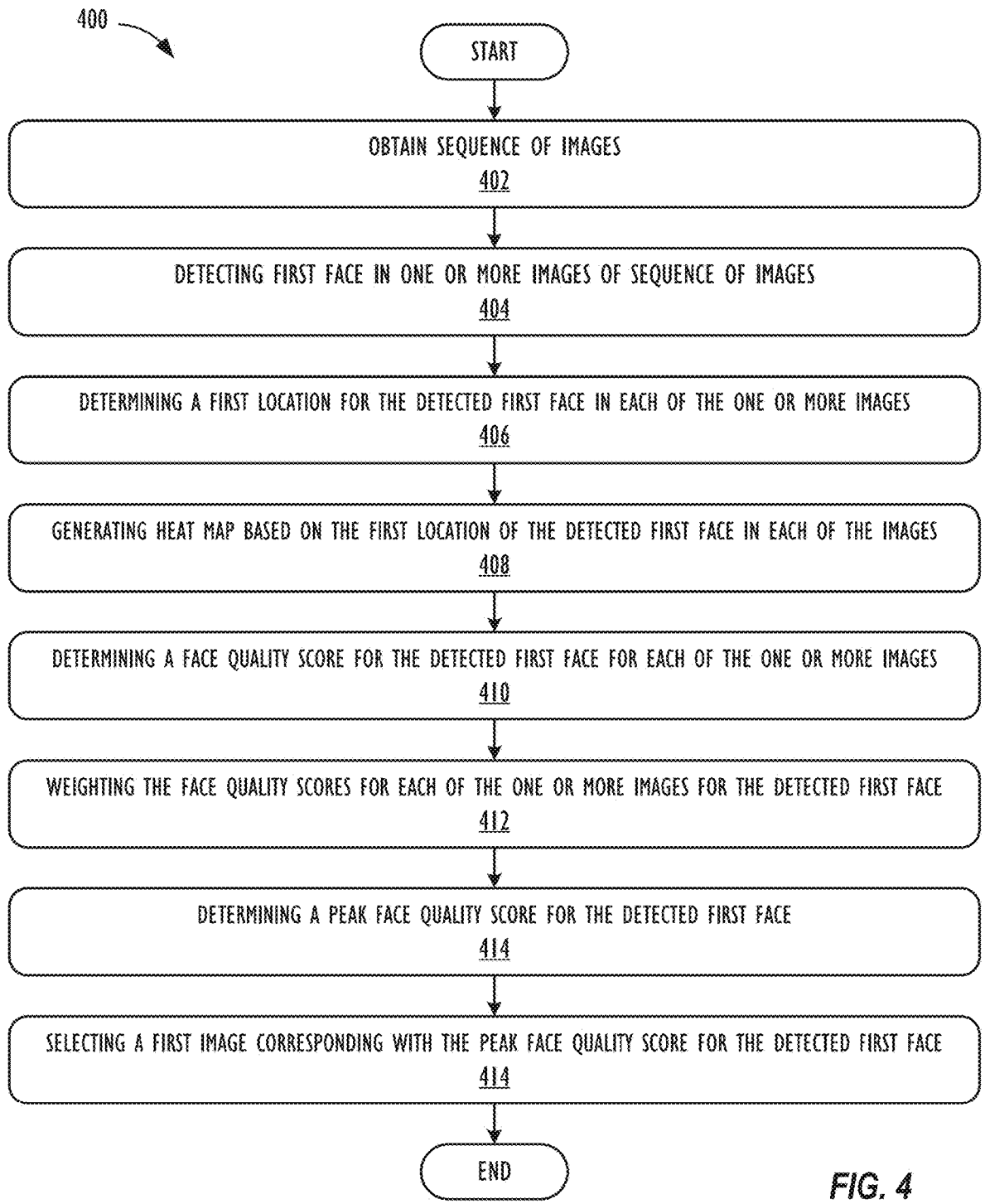
FIG. 4 is a flow diagram illustrating a technique for improved face quality of captured images 400, in accordance with aspects of the present disclosure.

FIG. 4 is flow diagram illustrating a technique for improved face quality of captured images 400, in accordance with aspects of the present disclosure. At step 402, the technique starts by first obtaining a sequence of images. Generally, this sequence of images may be obtained from an imaging device in the form of a burst of still images, video, slow-motion images, etc. The images in the sequence of images generally are temporally sequenced. At step 404, the technique includes detecting a first face in one or more images of the sequence of images. As an example, faces may be detected in the some of the images of the sequence of images using any known facial detection technique. At step 406, the technique includes determining a first location for the detected first face in each of the one or more images, of the sequence of images, having the detected first face. For example, once a face is detected, a location of the detected face may be determined. The detected face is tracked across the images where the face was detected. At step 408, the technique includes generating a heat map based on the first location of the detected first face in each of the images of the sequences of images. As an example, location information for the detected face may be accumulated for the sequence of images and used to generate a heat map describing where the detected face was located and how often the detected face was present a particular location in the frame across the sequence of images. At step 410, the technique includes by determining a face quality score for the detected first face for each of the one or more images, of the sequence of images, having the detected first face. For example, a MLM may be used to determine a face quality score to detected faces. The MLM may be trained to generate face quality scores based on overall picture worthiness of a face, rather than on specific features of a face or picture quality. At step 412, the technique includes weighting the face quality scores for each of the one or more images for the detected first face. In certain cases, this weight may be based on a heat map value, the heat map value determined based on the location of the detected first face in each of the images. For example, a first detected face that appears in approximately the same location within an image (i.e., relative to the overall extent of the image) across a larger number of images in the sequence of images may be associated with a higher heat map value than a second detected face that has moved around the frame across the sequence of images or appeared only sporadically. The face quality score associated with each respective detected face may be adjusted, for example, via a weighting process comprising multiplying the respective face quality score and the heat map value for each image of the sequence of images in which the respective detected face appears. In certain cases, the face quality value may alternatively (or additionally) be weighted based on a face recognition module's determination of whether a detected face is of a person that is known (or otherwise recognized) to the user. At step 414, the technique includes determining a peak face quality score for the detected first face. As an example, face quality scores for the detected face may be aggregated and peaks within the aggregated face quality scores may be detected. Peak detection may be performed within an N-number image sliding window. At step 416, the technique includes selecting a first image of the sequence of images, corresponding with the peak face quality score for the detected first face based at least in part on the face quality score and the generated heat map. For example, images corresponding with a detected peak in face quality score of a detected face may be selected. The face quality score for each image may be adjusted based on the heat map value. Selected images may be saved or used as display images to the user. In certain cases, selected images may be saved as captured images, for example, when capturing images in a shutterless mode where the image capturing device determines when to capture images rather a user of the image capturing device. It may be noted that multiple faces may be tracked for an image sequence and more than a single image may be selected from the image sequence, for example, by detecting a second face in one or more images of the sequence of images, determining a second location for the detected second face in each of the one or more images having the detected second face, generating a heat map based on the second location of the detected second face in each of the images of the sequences of images, determining a second face quality score for the detected second face for each of the one or more images, of the sequence of images, having the detected second face, determining a second peak face quality score for the detected second face based at least in part on the face quality score and the generated heat map, and selecting a second image corresponding with the second peak face quality score for the detected second face.

Figure 5:
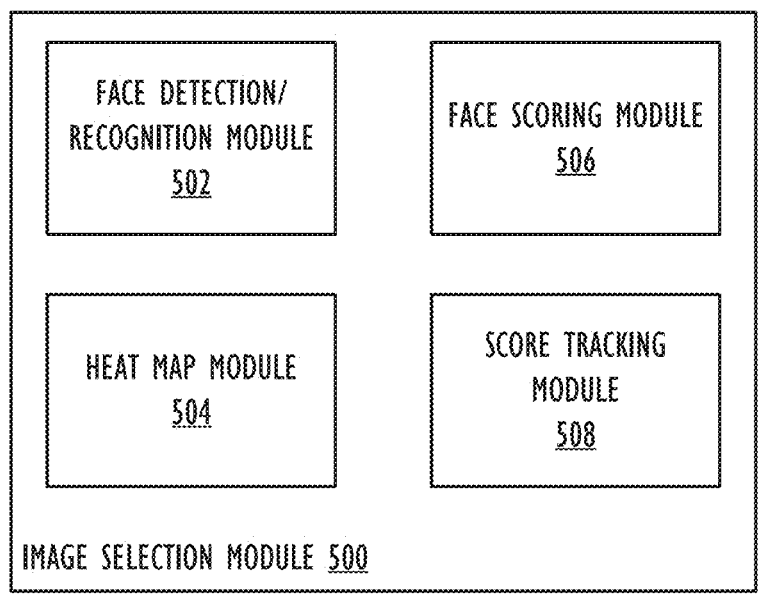
FIG. 5 is a block diagram of an image selection module, in accordance with aspects of the present disclosure

FIG. 5 is a block diagram of an image selection module 500, in accordance with aspects of the present disclosure. Face detection may be performed by a face detection/recognition module 502 for each image of the image sequence to detect and/or recognize faces visible within the image. The face detection/recognition module 502 can detect, track, and provide location information for faces within the images. In certain cases, face detection/recognition module 502 may be configured to recognize detected faces based, for example, a metadata network associated with the user's DA library. The image selection module 500 may also include a heat map module 504. This heat map indicates how often faces within the image sequence were located at varying parts of the image frame. Detected faces in each frame may also be evaluated and scored by a face scoring module 506. The face scoring module may include one or more MLM classifiers, such as the aforementioned MLM classifier trained based on overall "picture worthiness" of a face. The resulting face score for each face may be tracked by the score tracking module 508 across the image sequence and used, in conjunction with the heat map, to select one or more images of the image sequence.

Exemplary Hardware and Software

Figure 6:
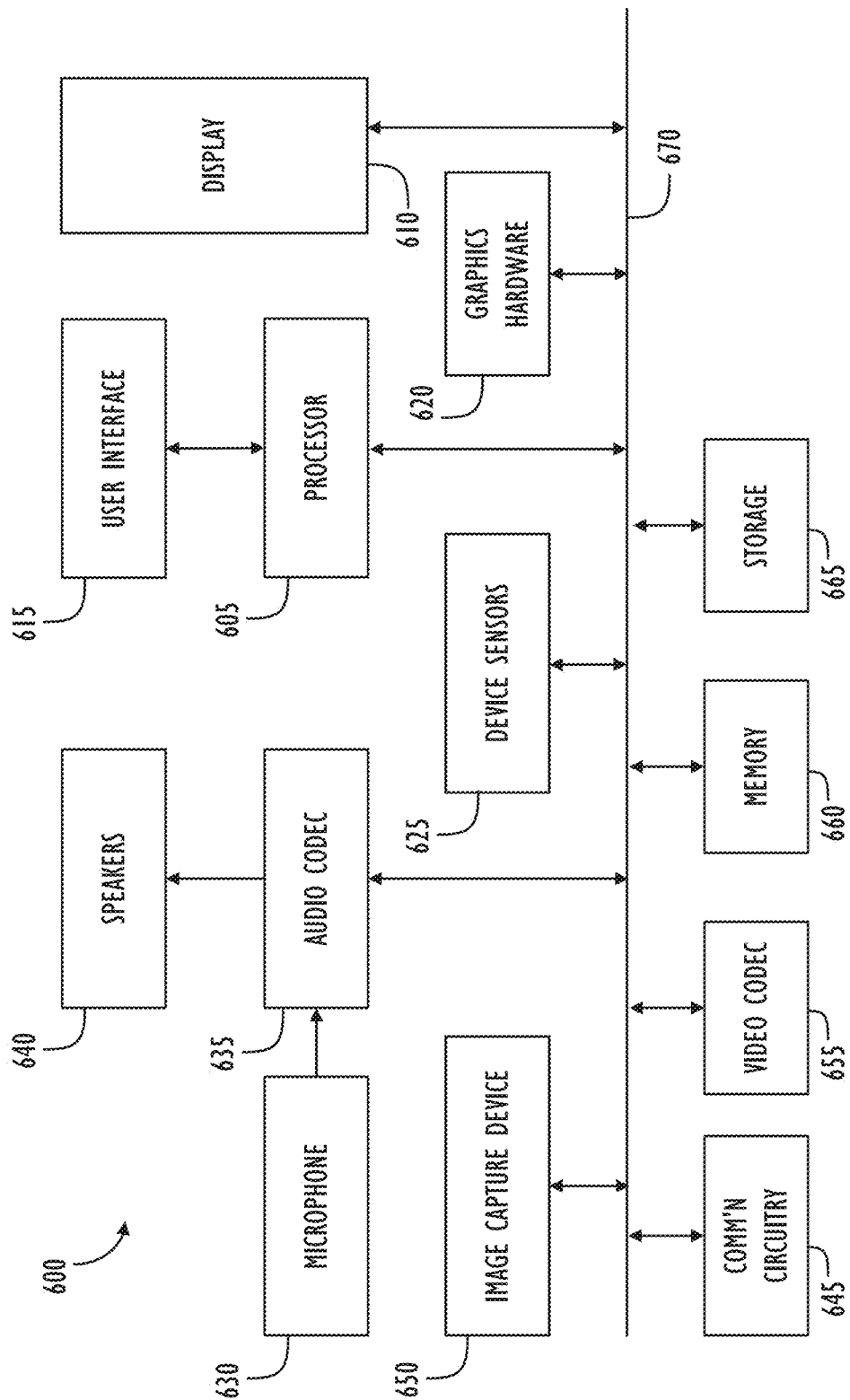
FIG. 6 shows a functional block diagram of a programmable electronic device, according to one embodiment.

Referring now to FIG. 6, a simplified functional block diagram of illustrative programmable electronic device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, imaging device 650, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as selecting images from a sequence of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image(s) that the user would like to capture (e.g., by clicking on a physical or virtual button at the moment the desired image is being displayed on the device's display screen). In one embodiment, display 610 may display a video stream as it is captured while processor 605 and/or graphics hardware 620 and/or imaging circuitry contemporaneously generate and store the video stream in memory 660 and/or storage 665. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Imaging device 650 may comprise one or more camera units configured to capture images, e.g., images which may be processed to generate depth/disparity information for such captured images, e.g., in accordance with this disclosure. Output from imaging device 650 may be processed, at least in part, by video codec(s) 655 and/or processor 605 and/or graphics hardware 620, and/or a dedicated image processing unit or image signal processor incorporated within imaging device 650. Images so captured may be stored in memory 660 and/or storage 665. Memory 660 may include one or more different types of media used by processor 605, graphics hardware 620, and imaging device 650 to perform device functions. For example, memory 660 may include memory cache, read-only memory (ROM), and/or random-access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, a sequence of images can be obtained from a variety of imaging devices which include, but are not limited to still imaging devices, video devices, non-visible light imaging devices, etc. It can be understood that various techniques may be used to detect and locate objects, determine trajectories for objects, and score the determined trajectories. Determining and aggregating trajectory scores may also be tuned to address specific scenarios.

Many other embodiments will be apparent to those of skill in the art upon reviewing the above description. The scope of the invention therefore should be determined with reference to the appended claims, along with the full scope of equivalents to which such claims are entitled.

As described above, one aspect of the present technology is the gathering and use of data available from various sources to improve the facial quality of captured imaged and selection of representative images. The present disclosure contemplates that in some instances, this gathered data may include personal information data that uniquely identifies or can be used to contact or locate a specific person. Such personal information data can include facial images, demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to capture or select images that are of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of facial recognition services or access to a user's DA library, the present technology can be configured to allow users to select to "opt in" or "opt out" of participation in the collection of personal information data during registration for services or anytime thereafter. In another example, users can select not to access facial recognition services or not permit access to the user's DA library. In such cases, the present disclosure contemplates providing certain services, such as face tracking, that may be utilized without utilizing services or permissions that have been opted out of. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images may be selected on tracked faces and based on non-personal information data or a bare minimum amount of personal information, such as the content being requested by the device associated with a user, other non-personal information available to the imaging services, or publicly available information.

The invention claimed is:

1. A computer-implemented method for image selection, the method comprising:
   obtaining a sequence of images;
   detecting a first face in one or more images of the sequence of images;
   determining a first location for the detected first face in the one or more images of the sequence of images having the detected first face;
   generating a heat map based on the first location of the detected first face across the images of the sequence of images, wherein the heat map includes heat map values based on determined locations of the detected first face in the sequence of images;
   determining face quality scores based on the heat map values for the detected first face in the images of the sequence of images; and
   selecting a first image of the sequence of images, based on the determined face quality scores for the detected first face.

2. The method of claim 1, further comprising:
   detecting a second face in one or more images of the sequence of images;
   determining a second location for the detected second face in each of the one or more images of the sequence of images having the detected second face, wherein the heat map is further based on the second location of the detected second face, and wherein the heat map indicates that the second location of the detected second face changes more than the first location of the detected first face; and
   filtering the detected second face based on the heat map.

3. The method of claim 2, wherein the heat map includes heat map values corresponding to the second locations of the detected second face in the sequence of images, and
   wherein the method further comprises comparing the heat map values corresponding to the second locations to a threshold heat map value.

4. The method of claim 1, wherein the face quality scores are determined based on initial quality scores output by a machine learning model.

5. The method of claim 1, wherein determining the face quality scores comprise:
   generating initial quality scores for the detected first face for images of the sequence of images; and
   determining the face quality scores based on the initial quality scores and the heat map values.

6. The method of claim 1, further comprising:
   determining a peak face quality score for the detected first face based on the face quality scores, wherein determining the peak face quality score comprises determining whether the face quality score peaks within a sliding window, and wherein the selecting the first image is based on the peak face quality score.

7. The method of claim 1, wherein selecting the first image of the sequence of images comprises storing the first image.

8. A non-transitory program storage device comprising instructions stored thereon to cause one or more processors to:
   obtain a sequence of images;
   detect a first face in one or more images of the sequence of images;
   determine a first location for the detected first face in each of the one or more images of the sequence of images having the detected first face;

generate a heat map based on the first location of the detected first face across the images of the sequence of images, wherein the heat map includes heat map values based on determined locations of the detected first face in the sequence of images;

determine face quality scores based on the heat map values for the detected first face in the images of the sequence of images; and select a first image of the sequence of images, based on the determined face quality scores for the detected first face.

9. The non-transitory program storage device of claim 8, wherein the instructions to determine the set of selected images further cause the one or more processors to:

detect a second face in one or more images of the sequence of images;

determine a second location for the detected second face in each of the one or more images of the sequence of images having the detected second face, wherein the heat map is further based on the second location of the detected second face, and wherein the heat map indicates that the second location of the detected second face changes more than the first location of the detected first face; and filter the detected second face based on the heat map.

10. The non-transitory program storage device of claim 9, wherein the heat map includes heat map values corresponding to the second locations of the detected second face in the sequence of images, and wherein the instructions to determine the set of selected images further cause the one or more processors to compare the heat map values corresponding to the second locations to a threshold heat map value.

11. The non-transitory program storage device of claim 8, wherein the face quality scores are determined based on initial quality scores output by a machine learning model.

12. The non-transitory program storage device of claim 8, wherein the instructions for causing the one or more processors to determine the face quality scores comprise instructions for causing the one or more processors to:

generate initial quality scores for the detected first face for images of the sequence os of images; and determine the face quality score based on initial quality scores and the heat map values.

13. The non-transitory program storage device of claim 8, wherein the instructions further cause the one or more processors to:

determine a peak face quality score for the detected first face based on the face quality scores, wherein the peak face quality score is determined based on whether the face quality score peaks within a sliding window, and wherein the instructions for selecting the first image comprises instructions to cause the processor to select the first image based on the peak face quality score.

14. The non-transitory program storage device of claim 8, wherein selecting the first image of the sequence of images comprises storing the first image.

15. An electronic device, comprising:

a memory;

one or more image capture devices; and one or more processors operatively coupled to the memory, wherein the one or more processors are configured to execute instructions causing the one or more processors to:

obtain a sequence of images;

detect a first face in one or more images of the sequence of images;

determine a first location for the detected first face in each of the one or more images of the sequence of images having the detected first face;

generate a heat map based on the first location of the detected first face across the images of the sequence of images, wherein the heat map includes heat map values based on determined locations of the detected first face in the sequence of images;

determine face quality scores based on the heat map values for the detected first face in the images of the sequence of images having the detected first face; and select a first image of the sequence of images, based on the determined face quality scores for the detected first face.

16. The electronic device of claim 15, wherein the one or more processors are configured to execute instructions that further cause the one or more processors to:

detect a second face in one or more images of the sequence of images;

determine a second location for the detected second face in each of the one or more images of the sequence of images having the detected second face, wherein the heat map is further based on the second location of the detected second face, and wherein the heat map indicates that the second location of the detected second face changes more than the first location of the detected first face; and filter the detected second face based on the heat map.

17. The electronic device of claim 15, wherein the heat map includes heat map values corresponding to the second locations of the detected second face in the sequence of images, and wherein the one or more processors are configured to execute instructions that further cause the one or more processors to compare the heat map values corresponding to the second locations to a threshold heat map value.

18. The electronic device of claim 15, wherein the face quality score is determined using a machine learning model based on initial quality scores output by the machine learning model.

19. The electronic device of claim 15, wherein the instructions for causing the one or more processors to determine the face quality scores comprise instructions for causing the one or more processors to:

generate initial quality scores for the detected first face for images of the sequence of images; and determine the face quality score based on initial quality scores and the heat map values.

20. The electronic device of claim 15, wherein the instructions further cause the one or more processors to:

determine a peak face quality score for the detected first face based at least in part on the face quality score and the generated heat map, wherein determining the peak face quality score comprises determining whether the face quality score peaks within a sliding window.

* * * * *

UNITED STATES PATENT AND TRADEMARK OFFICE
CERTIFICATE OF CORRECTION

PATENT NO. : 11,514,713 B2
APPLICATION NO. : 16/821611
DATED : November 29, 2022
INVENTOR(S) : Abhishek Singh et al.

It is certified that error appears in the above-identified patent and that said Letters Patent is hereby corrected as shown below:

In the Claims

Claim 12, Column 15, Line 42, delete "os" after -- sequence --

Signed and Sealed this
Seventeenth Day of January, 2023

*Katherine Kelly Vidal*
Katherine Kelly Vidal
*Director of the United States Patent and Trademark Office*